(12) United States Patent
Ahern et al.

(10) Patent No.: US 6,460,837 B1
(45) Date of Patent: Oct. 8, 2002

(54) FILAMENT BASED ENERGY ABSORBING SYSTEM

(76) Inventors: Edward J. Ahern, 329 Myrtle St., Manchester, NH (US) 03104; Fernand Beaudet, 1 Shawnee Pl., Londonderry, NH (US) 03053; Joseph Psenka, 473 N. Maniton Trail West, Lake Leelanau, MI (US) 49653

(*) Notice: Subject to any disclaimer, the term of this patent is extended or adjusted under 35 U.S.C. 154(b) by 0 days.

(21) Appl. No.: 09/729,437

(22) Filed: Dec. 4, 2000

(51) Int. Cl.[7] .................................................. F16F 1/36

(52) U.S. Cl. ...................................................... 267/148

(58) Field of Search ................................. 188/371–379; 267/146, 148, 149; 293/133; 248/636, 638

(56) References Cited

U.S. PATENT DOCUMENTS

| | | | | | |
|---|---|---|---|---|---|
| 3,616,126 | A | * | 10/1971 | Tungseth | 161/53 |
| 4,336,868 | A | * | 6/1982 | Wilson et al. | 188/376 |
| 4,601,367 | A | * | 7/1986 | Bongers | 188/376 |
| 5,419,416 | A | * | 5/1995 | Miyashita et al | 188/371 |

* cited by examiner

Primary Examiner—Christopher P. Schwartz
(74) Attorney, Agent, or Firm—Davis & Bujold, P.L.L.C.

(57) ABSTRACT

A filament based energy absorbing system for absorbing a force applied to a base structure. The filament based energy absorbing system comprising a backing member having a top surface and an opposed bottom surface. A first plurality of energy absorbing filaments being rigidly attached to the top surface of the planar backing member, and the first plurality of filaments extending away from the top surface for absorbing an applied force.

20 Claims, 5 Drawing Sheets

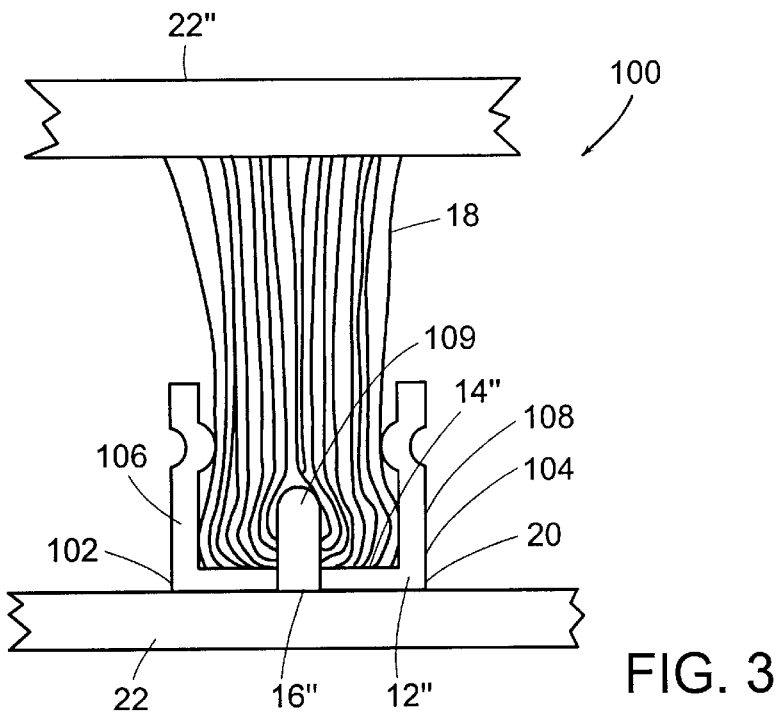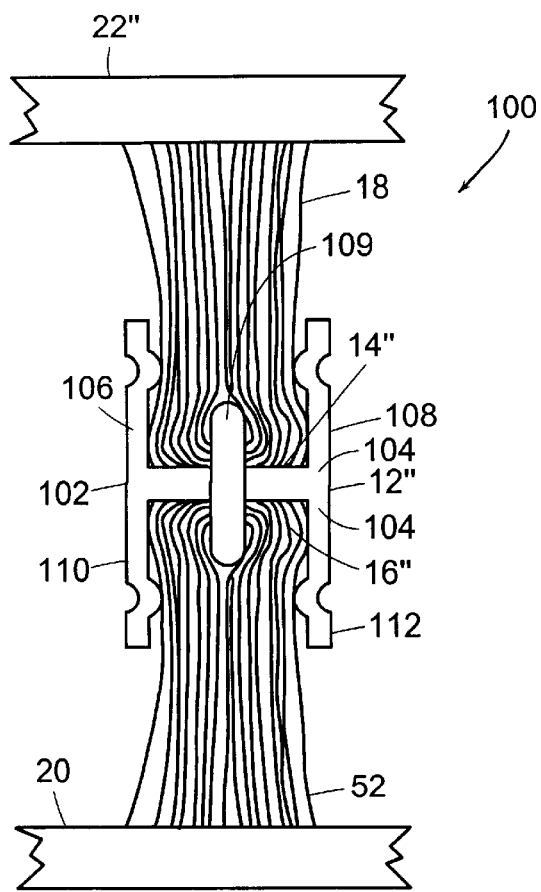
FIG. 3
FIG. 3A

FILAMENT BASED ENERGY ABSORBING SYSTEM

FILED OF THE INVENTION

The present invention relates to a filament based energy absorbing system and, more particularly, to a system which utilizes a plurality of inexpensive discrete filaments as the energy absorbing component of the system.

BACKGROUND OF THE INVENTION

Energy absorbing systems are used in a variety of applications every day. These systems are utilized as guard rails at exit off ramps (typically bright yellow canisters filled with water or sand) and elevator bump stops (to absorb the impact of a falling elevator which snapped its cable). A common application for such systems is to incorporate them into automobiles, trucks and other vehicles to make the vehicles safer during accidents. The energy absorbing systems (or energy absorbing materials) are placed at various critical locations within the vehicles so that, in the event of an accident, the energy of the accident is primarily absorbed by the energy absorbing system and not by the occupants of the vehicle.

Typical placement for these energy absorbing systems (or energy absorbing materials), in the vehicle, is between the interior pillar post covers and the pillar posts of the vehicle, within instrument panels, under headliners, behind knee bolsters, etc. Additionally, energy absorbing systems are placed between the bumper covers (FACIA) and the structural components of the vehicle (e.g. the actual bumper, the bumper shocks, the frame, etc.).

The energy absorbing systems are often created from injection molded polypropylene "egg crate" type material. Additional materials used for currently available energy absorbing systems are foam and bubble wrap. Each of these panels has to be custom designed and fitted for each individual application. This results in expensive tooling and production costs, since these pieces tend to be very rigid and, therefore, each piece has to be molded into the shape of the object to which it is being attached. Since the interior of each vehicle model tends to be dissimilar from that of any other vehicle model, each vehicle model would require its own specific set of energy absorbing systems or panels. Since, as stated above, many of these individual systems are injection molded, there is an extensive cost associated with producing each of these systems, as each one requires a unique mold and expensive tooling to manufacture the piece. Further, foam-based energy absorbing systems, when compressed, act as a solid barrier and no longer absorb energy. Since the average vehicle interior utilizes many energy absorbing systems or panels, it is clearly discernable how the use of rigid, injection-molded energy absorbing systems is a costly proposition for the automobile manufacturer.

SUMMARY OF INVENTION

Wherefore, it is therefore an object to the present invention to overcome the shortcoming and drawbacks associated with prior art energy absorbing systems and provide an energy absorbing system which is relatively inexpensive to manufacture.

It is a further object of the present invention to provide a system which does not require complex application specific tooling and intricate manufacturing procedures to produce the energy absorbing system.

It is a further object of the present invention to provide a system which can be utilized in a variety of different applications without extensive modification.

It is a further object of the present invention to provide a system which utilizes a plurality of inexpensive discrete filaments as the energy absorbing components or elements of the system.

The present invention results from the realization that a truly effective energy absorbing system can be achieved by utilizing a plurality of inexpensive discrete energy absorbing filaments attached to a backing member, so that the energy absorbing filaments function as the energy absorbing components or elements of the system.

The present invention features a filament based energy absorbing system including a backing member having a top surface and a bottom surface; and a first plurality of energy absorbing filaments rigidly attached to the top surface of the planar backing member so that the first plurality of filaments extend or radiate away from the top surface.

In a preferred embodiment of the present invention, the system may include a second plurality of energy absorbing filaments rigidly attached to the bottom surface of the planar backing member so that the second plurality of filaments extend or radiate away from the bottom surface. The connection mechanism for attaching the plurality of filaments may be, for example, a heat staking process, a sonic welding process, a standard fastener, or an adhesive. The system may include a connection mechanism for attaching the filament based energy absorbing system to a base structure requiring energy absorption. The energy absorbing filaments may have either linear or non-linear energy absorption characteristics and have either the same or different cross-sectional diameters. The energy absorbing filaments may all have same axial length or may have different axial lengths. The backing member may be a rigid material or a flexible material. The rigid material may be chosen from the group consisting of, for example, steel, brass, aluminum, wood, polypropylene, polyester, nylon or polyvinyl chloride while the flexible material may be chosen from the group consisting of steel, brass, aluminum, polypropylene, polyester, nylon or polyvinyl chloride.

The backing member may include a first longitudinal edge; a second longitudinal edge; a first longitudinal wall section rigidly attached to the first longitudinal edge and positioned perpendicular to and extending or radiating away from the top surface; and a second longitudinal wall section rigidly attached to the second longitudinal edge and positioned perpendicular to and extending or radiating away from the top surface, wherein the backing member forms a U-shaped channel surrounding the first plurality of energy absorbing filaments. The first and second longitudinal wall sections may be crimped toward one another to rigidly attach the first plurality of energy absorbing filaments to the backing member. The first plurality of energy absorbing filaments may be constructed of a material chosen from the group consisting of, for example, polypropylene, nylon, polyester, polyvinyl chloride, polystyrene, bassine, tampico, horse hair, pig bristle, animal fiber, palmyra, brass and steel.

The present invention also features a filament based energy absorbing system including: a backing member having a top surface, a bottom surface, a first longitudinal edge, a second longitudinal edge, a first longitudinal wall section rigidly attached to the first longitudinal edge and positioned perpendicular to and extending or radiating away from the top surface, and a second longitudinal wall section rigidly attached to the second longitudinal edge and positioned perpendicular to and extending or radiating away from the top surface; and a first plurality of energy absorbing filaments positioned on the top surface of the planar backing member so that the first plurality of filaments extends or radiate away from the top surface; wherein the backing member forms a U-shaped channel surrounding the first plurality of energy absorbing filaments.

In a preferred embodiment, the first and second wall sections may be crimped toward each other to rigidly attach the first plurality of energy absorbing filaments to the backing member. The backing member may further include a third longitudinal wall section rigidly attached to the first longitudinal edge and positioned perpendicular to and extending radiating away from the bottom surface, and a fourth longitudinal wall section rigidly attached to the second longitudinal edge and positioned perpendicular to and extending or radiating away from the bottom surface. The system may further include a second plurality of energy absorbing filaments positioned on the bottom surface of the planar backing member so that the second plurality of filaments radiate away from the bottom surface. The third and fourth longitudinal wall sections may be crimped toward each other to rigidly attach the second plurality of energy absorbing filaments to the backing member. The backing member may be constructed of a material chosen from the group consisting of steel, brass, aluminum, wood, polypropylene, polyester, nylon or polyvinyl chloride. The first plurality of energy absorbing filaments may be constructed of a material chosen from the group consisting of, for example, polypropylene, nylon, polyester, polyvinyl chloride, polystyrene, bassine, tampico, horse hair, pig bristle, animal fiber or palmyra.

DESCRIPTION OF THE DRAWINGS

Other objects, features and advantages of the present invention will occur to those skilled in the art from the following description and the accompanying drawings of the preferred embodiments, in which:

FIG. 3 is a diagrammatic view of a third embodiment of the filament based energy absorbing system of the present invention including a channel-based planar backing member;

FIG. 3A is a diagrammatic view showing a variation of the third embodiment of the filament based energy absorbing system according to FIG. 3;

DETAIL DESCRIPTION OF THE PREFERRED EMBODIMENTS

Figure 1:
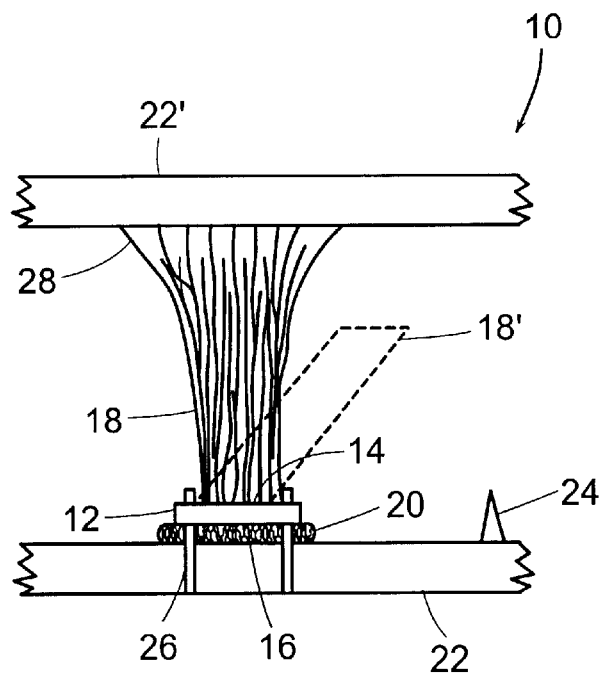
FIG. 1 is a diagrammatic view of the filament based energy absorbing system of the present invention.

In accordance with the present invention, the filament based energy absorbing system 10 (see FIG. 1) includes a backing member 12 having a top surface 14 and a bottom surface 16. A first end portion of a first plurality of energy absorbing filaments 18 are rigidly attached to top surface 14 of planar backing member 12 so that the first plurality of filaments 18 radiate and extend away from top surface 14. It is important to note that while first plurality of filaments 18 are shown as extending substantially perpendicular to top surface limitation of the invention. Specifically, it may be desirable, for various design reasons, to have the first plurality of filaments 18' (shown in phantom) extend and an angled, e.g. an angle of about 20 to 70 degrees, with respect to top surface 14.

A means or connection mechanism 20 attaches the filament based energy absorbing system 10 to a base structure 22, typically a pillar post panel, an instrument panel, a headliner, a knee bolster, etc., requiring energy absorption. The connection mechanism 20 can be one of many different means such as a heat staking process in which an extrusion 24 (shown to the side of system 10 for the sake of clarity) passes through a through bore or hole in the planar backing member 12, where this extrusion is melted to backing member 12 to form a plastic, rivet-like fastener which holds and secures the system 10 to the base structure 22. Alternatively, a sonic welding process can be employed where one of the two pieces (either the base structure 22 and/or the system 10) is vibrated at a high frequency until the two pieces actually fuse or melt together. Additionally, the connection mechanism 20 could be a standard industrial or construction adhesive, such as epoxy. Further, the connection mechanism 20 could be, for example, a conventional fastener 26 such as a staple, a mating nut and bolt or a mechanical snap lock.

The filaments 18 may have a linear energy absorbing characteristic such that the rigidity of the filament is equal and constant along its entire length (linear filaments). Alternatively, forvarious design reasons, it may be desirable to utilize filaments in which the rigidity of the filament varies along the length of the filament (non-linear filaments), e.g. the rigidity either increases or decreases along the length of the filaments 18. Such non-linear filaments may be utilized when it is desirable to control the location or area where the filaments will initially bend when exposed to a force. If it is desirable to have the filaments initially bend in the middle region of the filament, the filaments can be processed so that the rigidity of the filament in the middle region is reduced, e.g. the transverse cross section dimension of the filaments is decreased.

While, thus far, all of the plurality of filaments 18 have been describe as all being the same length, this is for illustrative purposes only and is not intended to be a limitation of the invention. Specifically, some of the plurality of filaments 18 may be longer or shorter then a majority of the other filaments 18 of the system 10. This would enable the designer to fine tune the energy-absorption characteristics of the system. For example, in the event of a minor impact which requires only minor energy absorption, only the longer filaments 18, i.e. portions 28 of the longer filaments 18, would absorb the impact. However, in the event of a larger force being exerted, the portions 28 of the longer filaments 18 would initially collapse and then the shorter "standard-length" filaments 18 would begin to absorb the energy of the exerted force. The plurality of energy absorbing filaments 18 may be constructed from various materials such as polypropylene, nylon, polyester, polyvinyl chloride, polystyrene, various other plastics, bassine, tampico, horse hair, pig bristle, animal fiber, or palmyra and have variety of different diameters (depending on the desired rigidity and other characteristics). Additionally, the placement of first plurality of energy absorbing filaments 18 may be varied or positioned in accordance with specific design criteria so that the desired energy absorbing characteristic, for the specific application, can be achieved.

Depending on the application, the planar backing member 12 may be constructed of a rigid material, for example, such as steel, brass, aluminum, wood, polypropylene, polyester, nylon or polyvinyl chloride. It is desirable to use a backing member 12 constructed of a rigid material when the base structure 22, to which the system is being attached, is relatively flat. In the event that a rigid material is used for the substantially flat backing member 12, various methods can be employed to attach filaments 18 to planar backing member 12. For example, holes (not shown) can be drilled or otherwise formed in the backing member 12 and a tuft of filaments can be attached or secured within each of the holes. Alternatively, an adhesive (not shown) can be used to glue the filaments 18 in the holes. Further, a wire drawing process can be used to draw the tufts of filaments 18 through the holes, whereafter the trailing ends of the tufts are stitched together.

In addition, the tufts can be fused to the flat surface of the backing member 12. Alternatively, the backing member 12 may be constructed of a somewhat flexible material such as a relatively thin piece of steel, brass, aluminum, polypropylene, polyester, nylon or polyvinyl chloride.

Figure 1A:
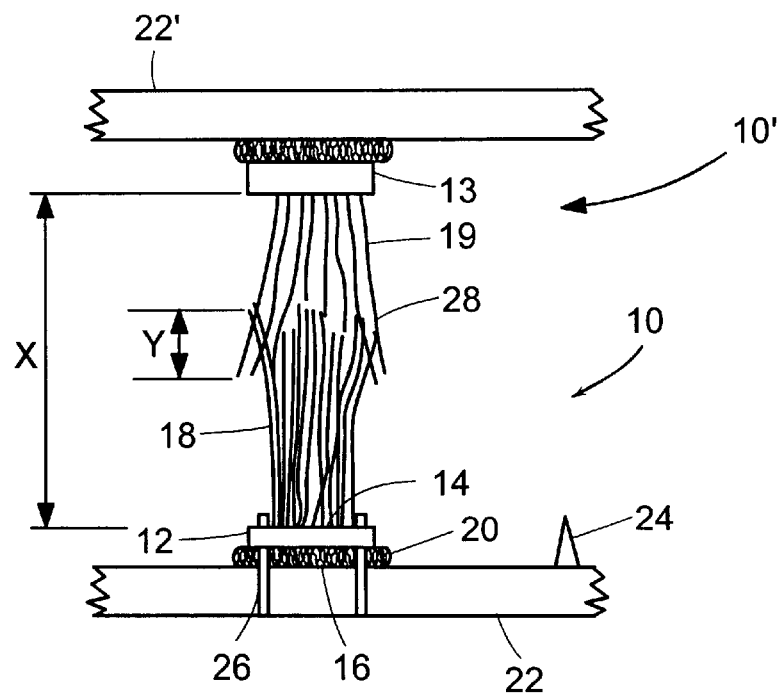
FIG. 1A is a diagrammatic view showing a pair of mating filament based energy absorbing systems according to the present invention.

If desired, the energy absorbing system 10 can also be axially aligned with another similar mating energy absorbing system 10' in which the free unattached ends of the second energy absorbing system 10' are stacked on top of and mate with the free unattached ends of the first energy absorbing system 10 (see FIG. 1A). More specifically, the second backing member supports a plurality of energy absorbing filaments 19. The free end of the filaments 19 of the second planar backing member 13 intertwine with, engage, mate and/or overlap with the plurality of filaments 18 of the first backing member 12. This arrangement creates an energy-absorbing system 10 which includes a pair of facing backing members 12 and 13 which each support a plurality of energy-absorbing filaments 18 and 19, respectively. The plurality of filaments 18 and 19 interlock and interact with each other so that backing members 12 and 13 are spaced apart from one another by a predetermined distance (x) which can be varied in accordance with specific design criteria of the application at hand. In addition, the amount of overlap (y) between the free ends of the plurality of filaments 18 and 19 of the first absorbing system 10 and the second energy absorbing system 10' can also be varied as necessary.

Figure 2:
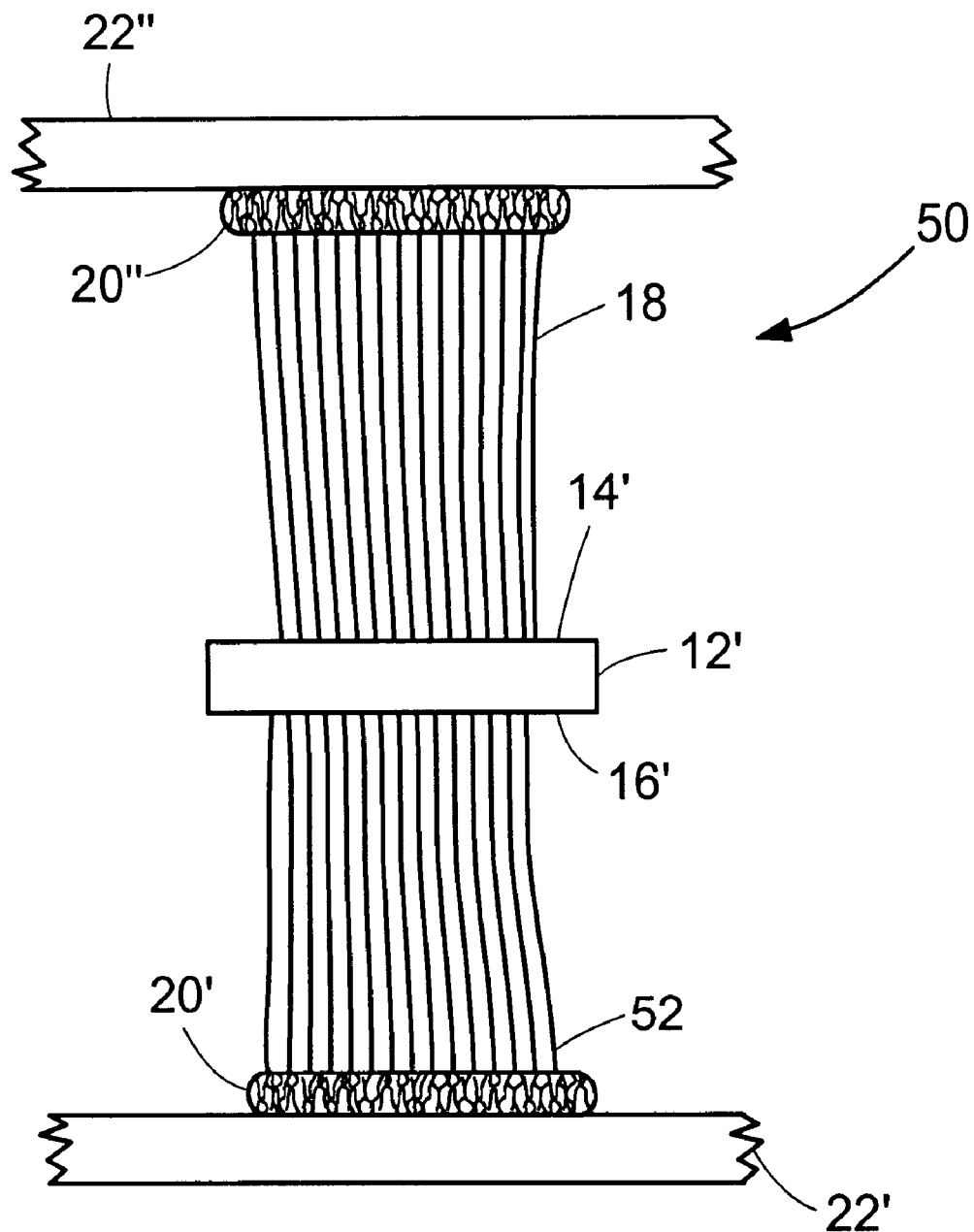
FIG. 2 is a diagrammatic view of a second embodiment of the filament based energy absorbing system of the present invention including a second plurality of energy absorbing filaments.

While, thus far, each energy absorbing system 10 has been shown to include only a first plurality of energy absorbing filaments 18, this is not necessarily a limitation of the present invention. As can be seen in FIG. 2, the filament based energy absorbing system 50 comprises a backing member 12' having a top surface 14' and an opposed bottom surface 16'. A first plurality of energy absorbing filaments 18 extend from the top surface 14'. In addition, a second plurality of energy absorbing filaments 52 extend from and are rigidly attached to the bottom surface 16' of the planar backing member 12' so that second plurality of energy absorbing filaments 52 radiate away from bottom surface 16'. In the case where energy absorbing system 50 is utilized which employs a first and a second plurality of energy absorbing filaments 18, 52, the energy absorbing filaments 52 are attached to the base structure 22', requiring energy absorption, via a conventional connection mechanism 20' while the energy absorbing filaments 18 are attached to the second base structure 22", requiring energy absorption, via a conventional connection mechanism 20". As stated earlier, the connection mechanism 20' and 20" may comprises a heat staking process, a sonic welding process, an adhesive, or a conventional fastener for connecting the free ends of the energy absorbing system 50 to the base structure 22' and/or base structure 22".

While, thus far, the backing member 12' has been shown as being a flat strip-like extrusion, this is not necessarily a limitation of the invention. Filament based energy absorbing system 100, according to FIG. 3, includes a backing member 12" which has a first longitudinal edge 102 and a second longitudinal edge 104. A first longitudinal wall section 106 is rigidly attached to the first longitudinal edge 102 and extending away from the top surface 14" of backing member 12". A second longitudinal wall section 108 is rigidly attached to the second longitudinal edge 104 and extending away from the top surface 14" of backing member 12". The first longitudinal wall section 106, the top surface 14" and the second longitudinal wall section 108 combine with one another to form of an elongate U-shaped channel which surrounds and encases an adjacent portion of the plurality of the filaments 18 which are supported by and extend away from the top surface 14" of the planar backing member 12". An intermediate region of the first and the second longitudinal wall sections 106 and 108 is crimped together to effectively pinch a first portion of the first plurality of energy absorbing filaments 18 so that they are rigidly attached to the planar backing member 12". If desired, a binding wire 109 may be utilized to draw the first plurality of energy absorbing filaments 18 into abutting engagement with the top surface 14' of the backing member 12".

If a bi-directional energy absorbing filament configuration is desired (see FIG. 3A), the backing member 12" may include a third longitudinal wall section 110 rigidly attached to the first longitudinal edge 102 and extending away from the bottom surface 16" of the planar backing member 12". In addition, a fourth longitudinal wall section 112 is rigidly attached to the second longitudinal edge 104 and extending away from the bottom surface 16" of backing member 12". Such arrangement, in turn, forms a backing member having an elongate H-shaped extrusion or channel. The longitudinal wall sections 110 and 112 surround a second plurality of filaments 52 so that the second plurality of filaments 52 are supported by and extend perpendicular to the bottom surface 16" of the planar backing member 12". An intermediate region of the third and the fourth longitudinal wall sections 110 and 112 is crimped together to effectively pinch an adjacent portion of the second plurality of energy absorbing filaments 52 so that they are rigidly attached to the planar backing member 12". If desired, the binding wire 109 may be utilized to draw the second plurality of energy absorbing filaments 52 into abutting engagement with the bottom surface 16' of the backing member 12".

Figure 10:
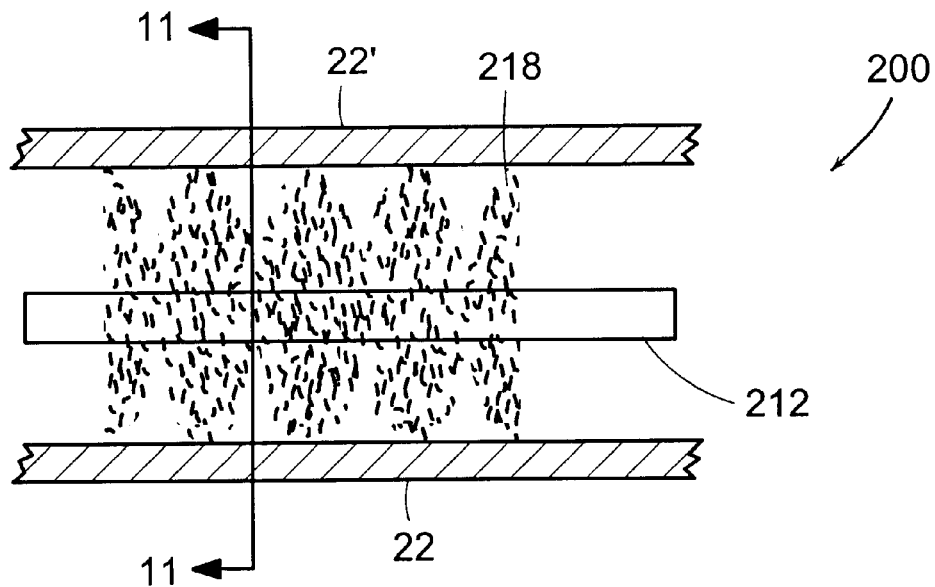
FIG. 10 is a diagrammatic view of a tenth embodiment of the filament based energy absorbing system of the present invention.

With reference now to FIG. 10, a tenth embodiment of the present invention will now be briefly discussed. As this embodiment is similar to the previous embodiments, only the difference between this embodiment and the previous nine embodiments will be discussed in detail. The major difference between this embodiment and the previous embodiments is that the filament based energy absorbing system 200 comprises a generally round or cylindrical backing member 212 which has a plurality of filaments 218 extending radially therefrom. The plurality of filaments 218 are arranged in a generally spiral or helically pattern about the periphery of the backing member 212 and the free ends of the plurality of filaments 218 are located to engage with an inwardly facing surface of one of the first and second base members 22, 22' and provide a shock absorbing effect therebetween. This embodiment of the filament based energy absorbing system 200 is relatively easy to manufacture in accordance with conventional wire brush manufacturing techniques while still providing the desired shock absorbing effect according to the present invention.

Figure 11:
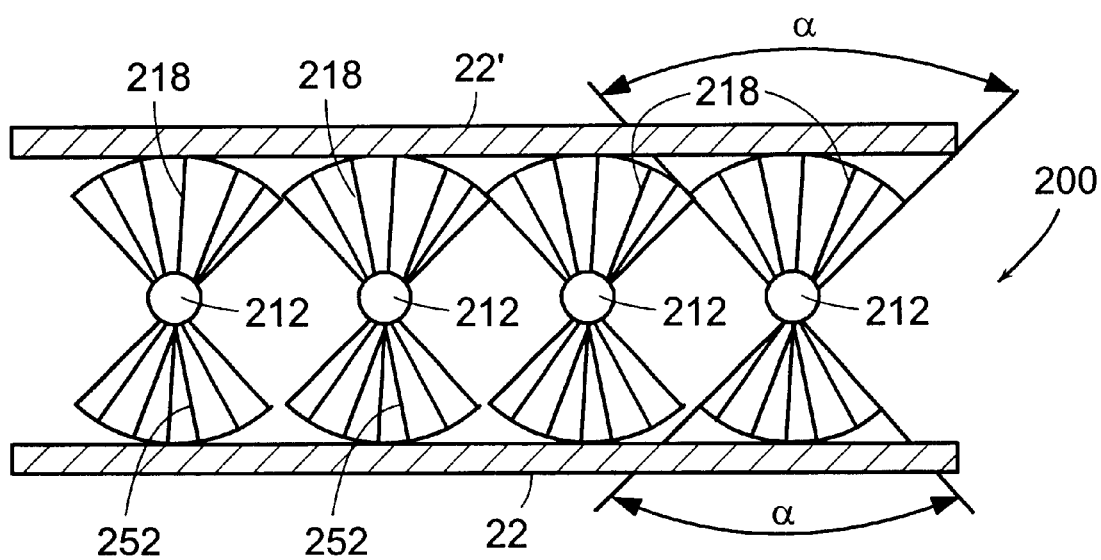
FIG. 11 is a diagrammatic cross sectional view of the filament based energy absorbing system of FIG. 10 along section line 11—11.

The overall transverse diameter of the filament based energy absorbing system 200 will range between about ¼ inch to about 2⅝ inches or more. If desired, the generally helically pattern of the plurality of filaments 218 which radiate from the exterior surface of the backing member 212 may radiate only over a limited angle ∝, e. g. an angle of about 45° to about 90° or so in a first direction and others of the plurality of filaments 252 radiate about 45° to about 120° degrees or so in a second opposite direction. By this limited angle arrangement, the opposed radiating plurality of filaments 218, 252 are still located to engage with and provide a shock absorbing effect between the first and second base structures 22 and 22' while also facilitate tighter packing or closer spacing of a plurality of the filament based energy absorbing systems 200 side by side adjacent one another in an area located between the first and second base structures 22 and 22', as can be seen in FIG. 11.

According to this arrangement of the base energy absorbing system 10, some of the plurality of filaments 218, 252 are located substantially perpendicularly with respect to the first and second base structures 22 and 22' while the remaining portion of the plurality filaments 218, 252 are located and form an angle with the first and second base structures 22 and 22' to provide a lesser degree of shock absorbing ability. Accordingly, the amount of shock absorbing ability provided by the plurality of filaments 218, 252 will vary and can be precisely controlled by suitable design of the filament base energy absorbing system 200 and/or their location within the area located between the first and second base structures 22 and 22'.

Figure 4:
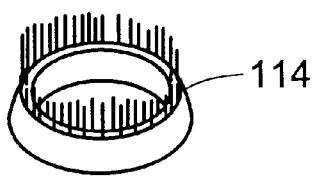
FIG. 4 is a diagrammatic view of a fourth embodiment of the filament based energy absorbing system of the present invention.
Figure 5:
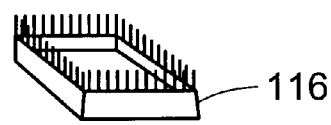
FIG. 5 is a diagrammatic view of a fifth embodiment of the filament based energy absorbing system of the present invention.
Figure 6:
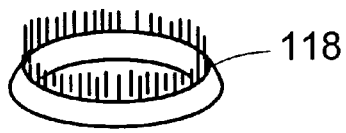
FIG. 6 is a diagrammatic view of a sixth embodiment of the filament based energy absorbing system of the present invention.
Figure 7:
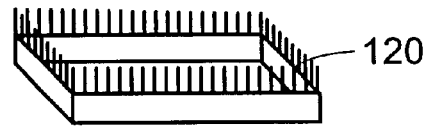
FIG. 7 is a diagrammatic view of a seventh embodiment of the filament based energy absorbing system of the present invention.
Figure 8:
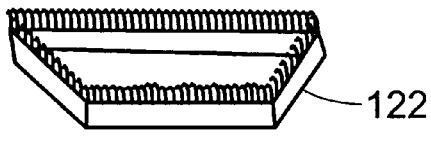
FIG. 8 is a diagrammatic view of an eight embodiment of the filament based energy absorbing system of the present invention.
Figure 9:
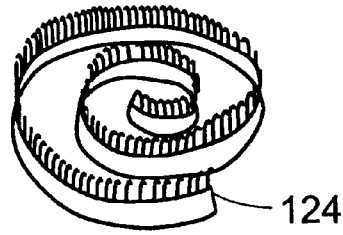
FIG. 9 is a diagrammatic view of a ninth embodiment of the filament based energy absorbing system of the present invention.

It is to be appreciated that the filament-based energy absorbing system 10, 50, 100 or 200 can be molded, formed or manufactured in whatever shape the specific design at hand requires. For example, in addition to the linear strip-like configuration shown in FIG. 3, the filament-based energy absorbing system 10, 50 or 100 can be manufactured in the shape of a ring or circle 114 (see FIG. 4), a square 116 (see FIG. 5), an oval or an ellipse 118 (see FIG. 6), a rectangle 120 (see FIG. 7), a trapezoid 122 (see FIG. 8), or a helix or a spiral 124 (see FIG. 9), etc. It is to be appreciated that a variety of other conventional or irregular shapes are also possible without departing from the spirit and scope of the present invention.

The second plurality of energy absorbing filaments 52 may be constructed of various materials (depending on the rigidity and characteristics desired) such as polypropylene, nylon, polyester, polyvinyl chloride, polystyrene, various other plastics, bassine, tampico, horse hair, pig bristle, animal fiber, and palmyra.

The first and second plurality of energy-absorbing filaments preferably have a transverse cross-section diameter of between 0.006 and 0.060 inch and more preferably a transverse cross-section diameter of between 0.010 and 0.032 inch. The first and second plurality of energy-absorbing filaments preferably have an axial length of between 0.25 and 3.00 inches and more preferably an axial length of between 0.375 and 2.00 inches.

Although specific features of the present invention are shown in some drawings but not others, this is for the sake of convenience only as each feature may be combined with any or all of the other features in accordance with the present invention. Further, other variation of the present invention will be readily apparent to those skilled in the art and are within the following claims.

What is claimed is:

1. A filament based energy absorbing system for absorbing a force applied to a base structure, the energy absorbing system comprising:

a first backing member having a top surface and a bottom surface;

a second backing member having a top surface and a bottom surface and the second backing member being spaced from the first backing member;

a first plurality of filaments having a first end thereof fixedly secured to the top surface of the first backing member, the first plurality of filaments radiating and extending away from the top surface of the first backing member toward the second backing member, and remote free ends of the first plurality of filaments being spaced from the second backing member;

a second plurality of filaments having a first end thereof fixedly secured to the top surface of the second backing member, the second plurality of filaments radiating and extending away from the top surface of the second backing member toward the first backing member, and remote free ends of the second plurality of filaments being spaced from the first backing member; and the remote free ends of the first plurality of filaments engaging with adjacent remote free ends of the second plurality of filaments to facilitate energy absorption.

2. The energy absorbing system according to claim 1, wherein the bottom surface of the first backing member has a connection mechanism for securing the bottom surface of the first backing member to a desired structure requiring energy absorption.

3. The energy absorbing system according to claim 2, wherein the connection mechanism is one of a heat staking process, a sonic welding process, a fastener and an adhesive.

4. The energy absorbing system according to claim 1, wherein the first and second backing members are manufactured from one of a rigid and a flexible member material.

5. The energy absorbing system according to claim 4, wherein the first and the second backing member is constructed of a material chosen from the group consisting of steel, brass, aluminum, wood, polypropylene, polyester, nylon, and polyvinyl chloride.

6. The energy absorbing system according to claim 1, wherein the bottom surface of the first backing member has a connection mechanism for securing the bottom surface of the first backing member to a first desired structure requiring energy absorption and the bottom surface of the second backing member has a connection mechanism for securing the bottom surface of the second backing member to a second desired structure requiring energy absorption.

7. The energy absorbing system according to claim 1, wherein the first and the second plurality of filaments have a uniform thickness along lengths thereof so that the first and the second plurality of filaments both have linear energy absorption characteristics.

8. The energy absorbing system according to claim 1, wherein the first and the second plurality of filaments have a variation in thickness along lengths thereof so that the first and the second plurality of filaments have non-linear energy absorption characteristics.

9. The energy absorbing system according to claim 1, wherein the first plurality of filaments have a uniform thickness along lengths thereof so that the first plurality of filaments have linear energy absorption characteristics while the first second plurality of filaments have a variation in thickness along lengths thereof so that the second plurality of filaments have non-linear energy absorption characteristics.

10. The energy absorbing system according to claim 1, wherein an axial length of each of the first and the second plurality of filaments is the same.

11. The energy absorbing system according to claim 1, wherein some of the first plurality of filaments have a different axial length than a remainder of the first plurality of filaments.

12. The energy absorbing system according to claim 1, wherein some of the second plurality of filaments have a different axial length than a remainder of the second plurality of filaments.

13. The energy absorbing system according to claim 1, wherein some of the first plurality of filaments have a different axial length than a remainder of the first plurality of filaments and some of the second plurality of filaments have a different axial length than a remainder of the second plurality of filaments.

14. The energy absorbing system according to claim 1, wherein both the first and the second plurality of filaments are constructed of a material chosen from the group comprising polypropylene, nylon, polyester, polyvinyl chloride, polystyrene, bassine, tampico, horse hair, pig bristle, animal fiber and palmyra.

15. The energy absorbing system according to claim 1, wherein the first plurality of filaments extended at an angle of from about 20° to 70° with respect to the top surface of the first backing member and the second plurality of filaments extends at an angle of about 20° to 70° with respect to the top surface of the second backing member.

16. A filament based energy absorbing system for absorbing a force applied to a base structure, the energy absorbing system comprising:

a first backing member having a top surface and a bottom surface;

a second backing member having a top surface and a bottom surface with the second backing member being spaced from the first backing member;

a first plurality of filaments having a first end thereof fixedly secured to the top surface of the first backing member, the first plurality of filaments radiating and extending away from the top surface of the first backing member toward the second backing member, and remote free ends of the first plurality of filaments extending toward the second backing member but being unconnected with the second backing member so that the remote free ends of the first plurality of filaments are movable relative to the second backing member.

17. The energy absorbing system according to claim 16, wherein the first plurality of filaments have a uniform thickness along lengths thereof so that the first plurality of filaments have linear energy absorption characteristics; and an axial length of each of the first plurality of filaments is the same.

18. The energy absorbing system according to claim 19, wherein the first and second backing members are manufactured from a material chosen from the group consisting of steel, brass, aluminum, wood, polypropylene, polyester, nylon, and polyvinyl chloride;

the first plurality of filaments are constructed of a material chosen from the group comprising polypropylene, nylon, polyester, polyvinyl chloride, polystyrene, bassine, tampico, horse hair, pig bristle, animal fiber and palmyra; and the first plurality of filaments extended at an angle of from about 20° to 70° with respect to the top surface of the first backing member.

19. The energy absorbing system according to claim 16, wherein the bottom surface of the first backing member has a connection mechanism for securing the bottom surface of the first backing member to a desired structure requiring energy absorption; and the first plurality of filaments are secured by one of a heat staking process, a sonic welding process, a fastener and an adhesive.

20. A filament based energy absorbing system for absorbing a force applied to a base structure, the energy absorbing system comprising:

a first backing member having a top surface and a bottom surface;

a second backing member having a top surface and a bottom surface and the second backing member being spaced from the first backing member;

a first plurality of filaments having a first end thereof fixedly secured to the top surface of the first backing member, the first plurality of filaments radiating and extending away from the top surface of the first backing member toward the second backing member, and remote free ends of the first plurality of filaments being spaced from the second backing member;

a second plurality of filaments having a first end thereof fixedly secured to the top surface of the second backing member, the second plurality of filaments radiating and extending away from the top surface of the second backing member toward the first backing member, and remote free ends of the second plurality of filaments being spaced from the first backing member; and the remote free ends of the first plurality of filaments engaging with adjacent remote free ends of the second plurality of filaments to facilitate energy absorption;

the first and the second plurality of filaments are respectively secured to one of the first and the second backing members by one of a heat staking process, a sonic welding process, a fastener and an adhesive; and the first and the second plurality of filaments have a uniform thickness along lengths thereof so that the first and the second plurality of filaments both have linear energy absorption characteristics.

* * * * *